US006510458B1

(12) United States Patent
Berstis et al.

(10) Patent No.: US 6,510,458 B1
(45) Date of Patent: Jan. 21, 2003

(54) BLOCKING SAVES TO WEB BROWSER CACHE BASED ON CONTENT RATING

(75) Inventors: Viktors Berstis; Herman Rodriguez, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/353,972

(22) Filed: Jul. 15, 1999

(51) Int. Cl.[7] .............................................. G06F 13/00
(52) U.S. Cl. .......................... 709/219; 709/329; 707/10
(58) Field of Search ................................ 709/217, 219, 709/329, 224; 707/10

(56) References Cited

U.S. PATENT DOCUMENTS

| | | | | |
|---|---|---|---|---|
| 5,706,507 A | * | 1/1998 | Schloss ........................ | 707/104 |
| 5,737,619 A | | 4/1998 | Judson ......................... | 395/761 |
| 5,754,774 A | | 5/1998 | Bittinger et al. ............ | 395/200 |
| 5,774,660 A | | 6/1998 | Brendel et al. ............. | 395/200 |
| 5,809,250 A | | 9/1998 | Kisor .......................... | 395/200 |
| 5,821,927 A | | 10/1998 | Gong .......................... | 345/335 |
| 5,852,717 A | | 12/1998 | Bhide et al. ................ | 395/200 |
| 5,878,213 A | | 3/1999 | Bittinger et al. ............ | 395/200 |
| 5,878,233 A | | 3/1999 | Schloss ....................... | 395/200 |
| 5,884,033 A | * | 3/1999 | Duvall et al. ............... | 709/206 |
| 5,913,033 A | * | 6/1999 | Grout .......................... | 709/219 |
| 6,122,657 A | * | 9/2000 | Hoffman, Jr. et al. ...... | 709/201 |
| 6,144,996 A | * | 11/2000 | Starnes et al. | |
| 6,178,461 B1 | * | 1/2001 | Chan et al. ................. | 709/247 |
| 6,336,117 B1 | * | 1/2002 | Massarani ................... | 707/100 |

FOREIGN PATENT DOCUMENTS

| | | | | |
|---|---|---|---|---|
| WO | WO9744747 | 11/1997 | ........... | G06F/17/30 |
| WO | WO9820426 | 5/1998 | ........... | G06F/15/16 |
| WO | 2329310 | 7/1998 | .......... | H04N/7/173 |
| WO | WO9904345 | 1/1999 | ........... | G06F/13/00 |

OTHER PUBLICATIONS

Bisson, S.; Generation XML; Application Development Advisor; vol. 2, No. 2, pp. 32–34.
Douglis, F. et al; HPP: HTML Macro–Preprocessing to Support Dynamic Document Caching; Proceedings of the USENIX Symposium on Internet Technologies and Systems, pp. 83094, 1997.
Lie, HW; World–Wide Web Technology; 1995 CERN School of Computer Proceedings, pp. 277.
Hutson, et al.; Technical Disclosure Bulletin vol. 39, No. 11, pp. 197–198; Conditional Hypertext Mark–up Language Tags to Dynamically Change Web Pages.
Isensee, et al; Filtering Internet Content; Technical Disclosure Bulletin vol. 40, No. 12, pp. 181–182.
Isensee, et al.; Look Ahead Filtering of Internet Content; Technical Disclosure Bulletin vol. 40, No. 12, pp. 143–144.

* cited by examiner

Primary Examiner—Viet D. Vu
(74) Attorney, Agent, or Firm—Duke W. Yee; Jeffrey S. LaBaw; Christopher P. O'Hogan

(57) ABSTRACT

A user sets preference parameters that filter web page contents from being stored in the cache. The preferences relate to the web page's contents and attributes. Before caching the web page, the contents and attributes of the web page are filtered solely as a function of the web browser. Cache filters take a variety of forms, such as ratings filters, web page identifier filters, and key word filters, which scan accessed contents of a web page for user selected terms. The filtered web page is then blocked from entry in the browser's cache based on the filtering process. Conversely, a user sets preference parameters that filter web page contents to override the block from cache preferences. The browser responds by storing the filtered web pages that were previously designated as web pages not to be cached.

29 Claims, 10 Drawing Sheets

RECREATIONAL SOFTWARE ADVISORY COUNCIL (RSAC)
RATING SYSTEM

|  | VIOLENCE RATING DESCRIPTOR | NUDITY RATING DESCRIPTOR | SEX RATING DESCRIPTOR | LANGUAGE RATING DESCRIPTOR |
|---|---|---|---|---|
| LEVEL 4 | RAPE OR WANTON, GRATUITOUS VIOLENCE | FRONTAL NUDITY (QUALIFYING AS PROVOCATIVE DISPLAY) | EXPLIXCIT SEXUAL ACTS OR SEX CRIMES | CRUDE, VULGAR LANGUAGE OR EXTREME HATE SPEECH |
| LEVEL 3 | AGGRESSIVE VIOLENCE OR DEATH TO HUMANS | FRONTAL NUDITY | NON-EXPLICIT SEXUAL ACTS | STRONG LANGUAGE OR HATE SPEECH |
| LEVEL 2 | DESTRUCTION OF REALISTIC OBJECTS | PARTIAL NUDITY | CLOTHED SEXUAL TOUCHING | MODERATE EXPLETIVES OR PROFANITY |
| LEVEL 1 | INJURY TO HUMAN BEING | REVEALING ATTIRE | PASSIONATE KISSING | MILD EXPLETIVES |
| LEVEL 0 | NONE OF THE ABOVE OR SPORTS RELATED | NONE OF THE ABOVE | NONE OF THE ABOVE OR INNOCENT KISSING; ROMANCE | NONE OF THE ABOVE |

*FIG. 4*

HTTP/1.0 200 OK
Date: Fri, 15 Jan 1999 12:01:34 GMT
Last-modified: Wednesday, 13-Jan-99 00:30:23 GMT
Protocol: {PICS-1.1 {headers PICS-Label}}
PICS-Label:
(PICS-1.1 http://www.rsac.org/ratingsv01.html labels
on "1999.01.01T09:01-0000
exp "1999.12.31T23:59-0000
for "http://www.rsac.org/home.html"
r (n 0 s 0 v 0 l 0))
Content-type: text/html ...contents of home.html...

*FIG. 10*

```
((PICS-version 1.0)
  (rating-system "http://www.rsac.org/Ratings/Description/")
  (rating-service "http://www.rsac.org/ratingsv01.html")
  (name "RSACi")
  (description "The Recreational Software Advisory Council rating service for the Internet.
Based on the work of Dr. Donald F. Roberts of Stanford University, who has studied the
effects of media for nearly 20 years.")
  (category
    (transmit-as "v")
    (name "Violence")
    (label
      (name "Level 0: No violence")
      (description "No aggressive violence; No natural or accidental violence.")
      (value0))
    (label
      (name "Level 1: Fighting")
      (description "Creatures injured or killed; damage to realistic objects.")
      (value 1))
    (label
      (name "Level 2: Killing")
      (description "Humans or creatures injured or killed. Rewards injuring non-threatening
creatures.")
      (value 2))
    (label
      (name "Level 3: Killing with blood and gore")
      (description "Humans injured or killed.")
      (value 3))
    (label
      (name "Level 4: Wanton and gratuitous violence")
      (description "Wanton and gratuitous violence.")
      (value 4)))
  (category
    (transmit-as "s")
    (name "Sex")
    (label
      (name "Level 0: None")
      (description "No sexual activity portrayed/Romance.")
      (value 0))
    (label
      (name "Level 1: Passionate kissing")
      (description "Passionate kissing.")
      (value 1))
    (label
      (name "Level 2: Clothed sexual touching")
      (description "Clothed sexual touching.")
      (value 2))
    (label
      (name "Level 3: Non-explicit sexual touching")
      (description "Non-explicit sexual touching.")
      (value 3))
    (label
      (name "Level 4: Explicit sexual activity")
      (description "Explicit sexual activity.")
      (value 4)))
```

*FIG. 5A*

```
(category
  (transmit-as "n")
  (name "Nudity")
  (label
    (name "Level 0: None")
    (description "No nudity")
    (value 0))
  (label
    (name "Level 1: Revealing attire")
    (description "Revealing attire.")
    (value 1))
  (label
    (name "Level 2: Partial nudity")
    (description "Partial nudity.")
    (value 2))
  (label
    (name "Level 3: Frontal nudity")
    (description "Frontal nudity.")
    (value 3))
  (label
    (name "Level 4: Provocative frontal nudity")
    (description "Provocative display of frontal nudity.")
    (value 4)))
(category
  (transmit-as "l")
  (description "Language")
    (label(name "Level 0: Inoffensive slang")
        (description "Inoffensive slang; no profanity.")
        (value 0))
  (label(name "Level 1: Mild Expletives")
        (description "Mild expletives. Or mild terms for body functions.")
        (value 1))
  (label(name "Level 2: Moderate Expletives")
        (description "Expletives; non-sexual anatomical references.")
        (value 2))
  (label(name "Level 3: Obscene Gestures")
        (description "Strong, vulgar language; obscene gestures. Use of epithets.")
        (value 3))
  (label(name "Level 4: Explicit or crude language")
        (description "Extreme hate speech or crude language. Explicit sexual refernces.")
        (value 4))))
```

FIG. 5B

BLOCKING SAVES TO WEB BROWSER CACHE BASED ON CONTENT RATING

BACKGROUND OF THE INVENTION

1. Technical Field

The present invention relates generally to an improved data processing system and, in particular, to a method and system for requesting, responding, and caching to a request message. Still more particularly, the present invention provides a method and system for implementing a content rating-sensitive response for filtering items entered in a cache.

2. Description of Related Art

The World Wide Web (WWW, also known simply as "the Web") is an abstract cyberspace of information that is physically transmitted across the hardware of the Internet. In the Web environment, servers and clients communicate using Hypertext Transport Protocol (HTTP) to transfer various types of data files. Much of this information is in the form of web pages identified by unique Uniform Resource Locators (URLs) or Uniform Resource Identifiers (URIs) that are hosted by servers on web sites. The web pages are often formatted using Hypertext Markup Language (HTML), which is a file format that is understood by software applications called web browsers. A browser requests the transmission of a web page from a particular URL, receives the web page in return, parses the HTML of the web page to understand its content and presentation options, and displays the content on a computer display device. By using a web browser, a user may navigate through the Web using URLs to view web pages.

The creation and publication of web pages is an unrestricted and uncoordinated process. The latest news, book reviews, amateur poetry, games, research, stock and bond price quotes, chat rooms, groups, clubs, shareware, technical support, on-line shopping, etc., may be found on the Web. However, some of the published text, graphics, images, and video clips may contain content that some people regard as unpleasant or objectionable.

While browsing the Web, a user may follow a hyperlink from one web page to another web page. The user may not know what type of content will be viewed at the target or destination of the hyperlink, as hyperlinks are usually very short text strings that provide only a term or a few words that may interest the user given the context of the surrounding material. The content of the presented hyperlink is often a text string that merely provides the URL of the destination Web page, and the URL is arbitrarily defined by the Webmaster of a web site or by the author. Hence, there is no guarantee that the hyperlink seen by the user provides an indication of its content. A user may follow a hyperlink without knowing that the destination web page will contain material that the user regards as objectionable.

As the Web continues to increase dramatically in size, corporations and organizations have attempted to promote themselves as web portals or, following the analogy of the Internet and the Web as being an information superhighway, as on-ramps to the Web. By indexing and collecting vast amounts of information resources within one web site, a web portal attempts to become a user's favorite Web starting point for each navigation session of the Web. A user, knowing that he may be able to find almost all desired information within a single web site, may prefer to search and browse through the web portal. A web portal gains a commercial advantage through increased viewership by receiving more advertisement revenue per web page viewed. However, in an attempt to attract as many users as possible, web portals increasingly gather information content together on a single web site, knowing that some of the information will offend the users of various interest groups.

The same situation applies to web search engines. As the World Wide Web has increased in size, search engines have been created to provide help for navigating through the information in cyberspace. These search engines index and store large amounts of information from the Web, without regard to content, in order to provide web searches that are as complete and as thorough as possible. When a user submits a search request to the web search engine, the user may receive some offensive content intermixed with useful information that the user is attempting to find.

In an effort to provide a user with the ability to screen out objectionable content, web browsers have been updated to enable the user to set rating level preferences within the user's web browser. Other filtering applications have been created that allow user rating level preferences, such as SurfWatch™ from SurfWatch Software, and CyberSitter™ from Solid Oak Software, that work in coordination with the browser. By setting rating preferences for a variety of content categories, a user may filter out various contents before the user views the content on the user's display. For each web page that a web browser receives, the web browser or filtering application checks the web page for objectionable content according to the rating preference parameters set by the user.

As a user browses the Web, hyperlinks may be followed without worry of viewing offensive material. Search requests may be submitted to search engines without receiving both desired and undesired content. However, the offensive material is still transmitted by the web servers and received by the web browser.

Similar problems are encountered when the user accesses sensitive sites on the Internet, such as e-commerce, banking, stock and commodities trading, and professional services. Once downloaded, the information contained in those sites is immediately cached to a memory and/or disk cache. The information is then available to anyone having access to the user's computer memory, whether the computer is accessed locally or remotely.

Currently, the user has very little control of the browser cache other that to allocate cache size, both memory cache and disk cache, and to perform a clearing operation on the data contents already stored in the browser cache. Conventional browser technology does not give the user the option of restricting assess or blocking the incoming web page from the browser cache while still presenting the requested web page for viewing. At best the user is given the option of blocking web pages which exceed a predefined size, in a round about manner by setting the browser cache size preference lower that the size of a requested web page.

It would be advantageous to provide a browser with the capability of blocking web page information from the browser cache. It would further be advantageous to allow the user to predefine preferences for selecting which web pages to be blocked from cache. It would be even more advantageous to provide browsers a means for viewing information which is never written to cache. It would also be advantageous to provide the user with a means to block information from cache based in the identity of the information; the content of the information by scanning the document for key terms; and finally by information ratings associated with the information, such as the present content rating system currently carried by some URL's assessed on the Internet.

SUMMARY OF THE INVENTION

The present invention provides a method and system for filtering the content of a web page to be cached, solely as a function of the web browser. In the present invention, a user sets preference parameters that filter web page contents from being stored in the cache. Cache filters take a variety of forms, such as ratings filters, web page identifier filters, and key word filters, which scan accessed contents of a web page for user selected terms. The filtered web page is then blocked from the browser's cache. Conversely, a user sets preference parameters that filter web page contents to override the block from cache preferences and store the filtered web pages that were previously designated as web pages not to be cached.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 shows the four categories of the RSACi system, with the five levels and their descriptors;

FIGS. 5A and 5B provide an example of a rating service described by a document of MIME type application/pics-service in accordance with the RSACi rating system;

FIG. 10 shows an example of an HTTP response with the Protocol header and the PICS-Label header;

DETAILED DESCRIPTION OF THE PREFERRED EMBODIMENT

Figure 1:
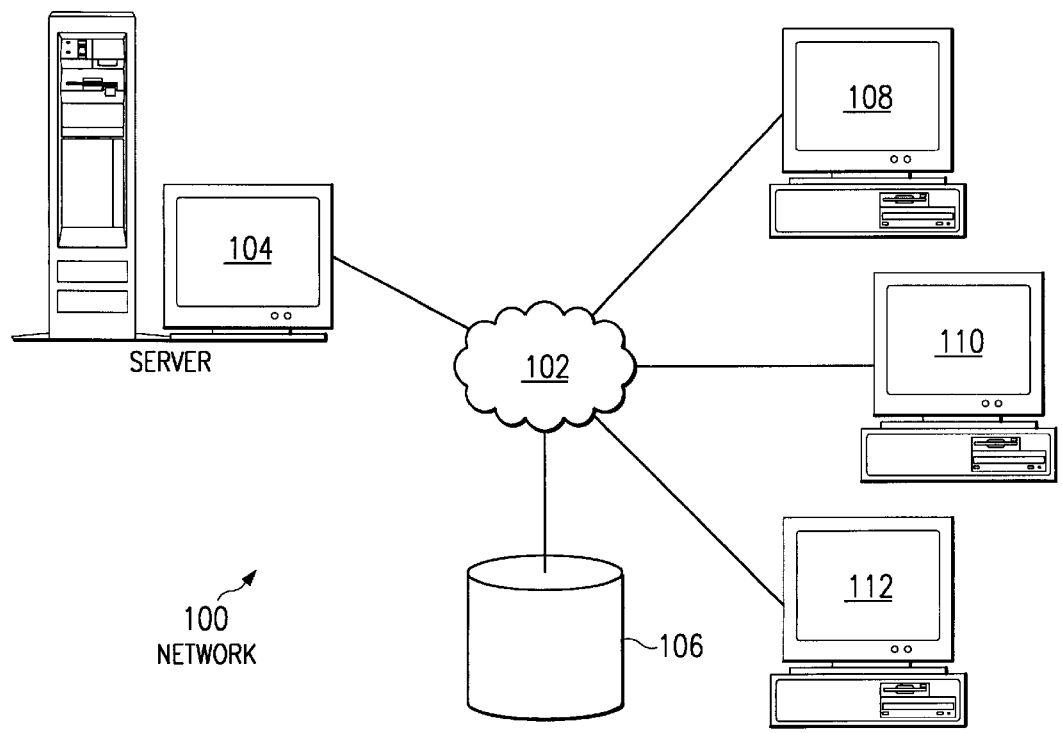
FIG. 1 is a pictorial representation of a distributed data processing system in which the present invention may be implemented.

With reference now to the figures, FIG. 1 is a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, server 104 is connected to network 102, along with storage unit 106. In addition, clients 108, 110 and 112 are also connected to network 102. These clients 108, 110 and 112 may be, for example, personal computers or network computers. For purposes of this application, a network computer is any computer coupled to a network, which receives a program or other application from another computer coupled to the network. In the depicted example, server 104 provides data, such as boot files, operating system images, and applications, to clients 108, 110 and 112. Clients 108, 110 and 112 are clients to server 104. Distributed data processing system 100 may include additional servers, clients, and other devices not shown. In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as, for example, an intranet, a local area network (LAN), or a wide area network (WAN). FIG. 1 is intended as an example and not as an architectural limitation for the present invention.

Figure 2:
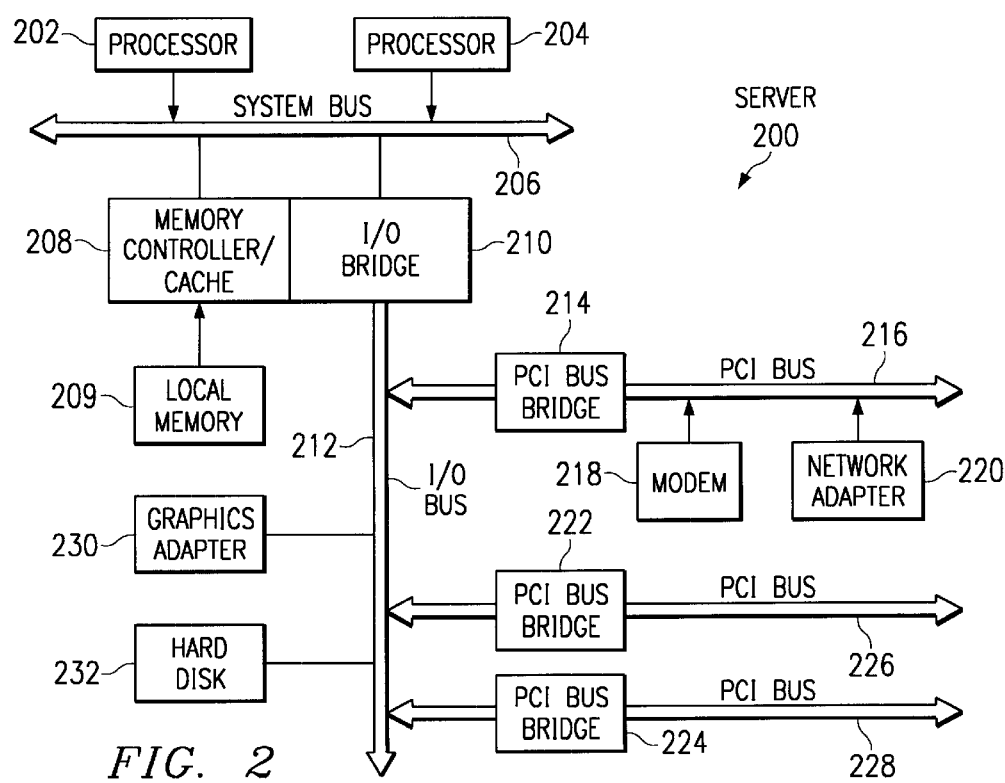
FIG. 2 is a block diagram depicting a data processing system that may be implemented as a server in accordance with the present invention.

Referring to FIG. 2, a block diagram depicts a data processing system that may be implemented as a server, such as server 104 in FIG. 1, in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition or in place of the hardware depicted. The depicted example is not meant to imply architectural limitations with respect to the present invention.

The data processing system depicted in FIG. 2 may be, for example, an IBM RISC/System 6000, a product of International Business Machines Corporation in Armonk, N.Y., running the Advanced Interactive Executive (AIX) operating system.

Figure 3:
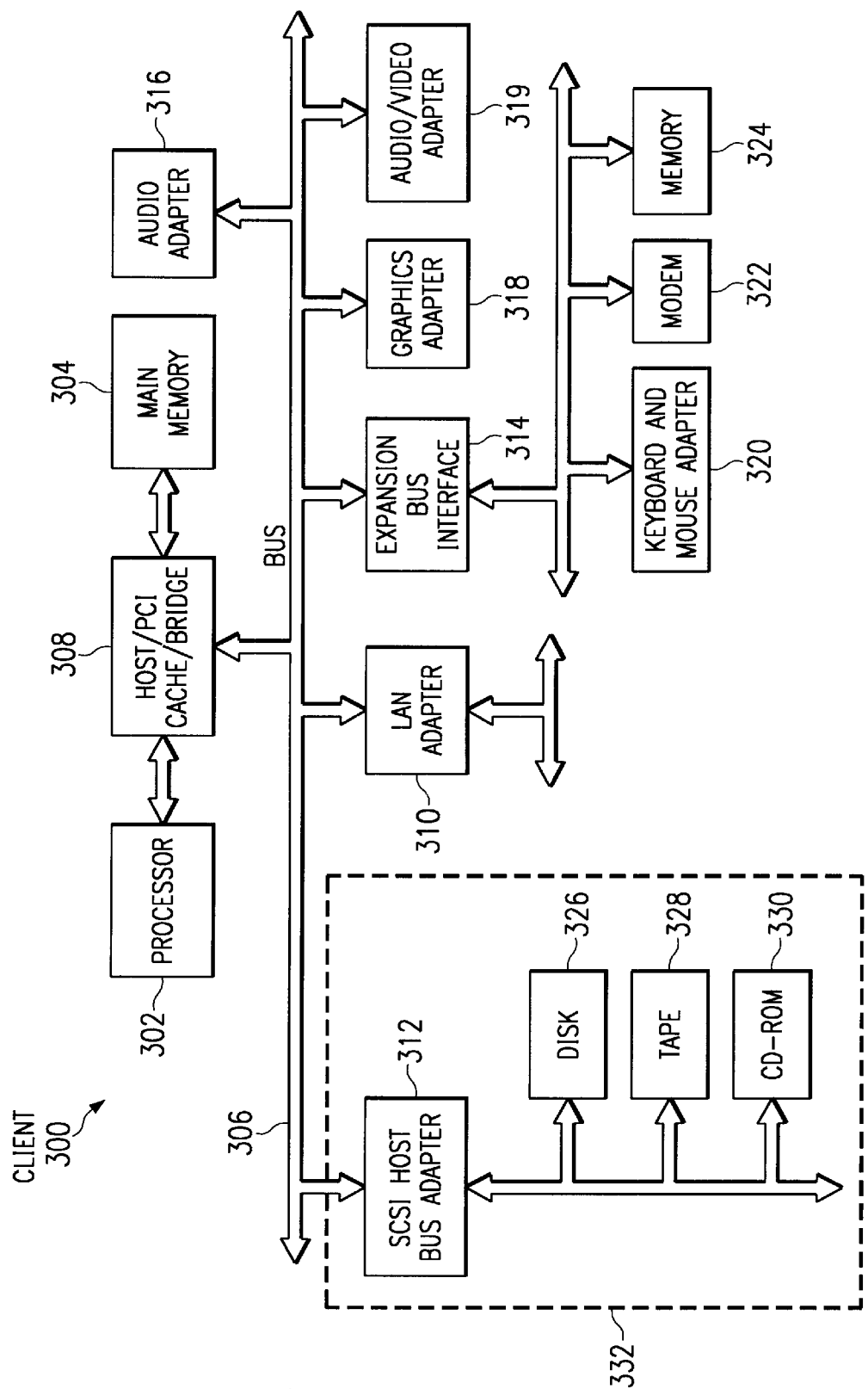
FIG. 3 is a block diagram illustrating a data processing system that may be implemented as a client in accordance with the present invention.

With reference now to FIG. 3, a block diagram illustrates a data processing system that may be implemented as a client, such as client 108 in FIG. 1, in accordance with the present invention. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3, denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations.

Internet, also referred to as an "internetwork," is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the businesses or providing other information, seeking to engender brand loyalty. Many federal, state, and local government agencies are also employing Internet sites for informational purposes, particularly agencies which must interact with virtually all segments of society, such as the Internal Revenue Service and secretaries of state. Providing information guides and/or searchable databases of online public records may reduce operating costs. Further, the Internet is becoming increasingly popular as a medium for commercial transactions.

Currently, the most commonly employed method of transferring data over the Internet is to employ the World Wide Web environment. Other Internet resources exist for transferring information, such as File Transfer Protocol (FTP) and Gopher, but these have not achieved the popularity of the Web. In the Web environment, servers and clients effect data transactions using Hypertext Transfer Protocol (HTTP), a known protocol for handling the transfer of various data files (e.g., text, still graphic images, audio, motion video, etc.). Information is formatted for presentation to a user by a standard page description language, the Hypertext Markup Language (HTML). In addition to basic presentation formatting, HTML allows developers to specify "links" to other Web resources, usually identified by a Uniform Resource Locator (URL). A URL is a special syntax identifier defining a communications path to specific information. Each logical block of information accessible to a client, called a "page" or a "web page," is identified by a URL.

The URL provides a universal, consistent method for finding and accessing information, not necessarily for the user, but mostly for the user's web "browser." A browser is a software application for requesting and receiving content from the Internet or World Wide Web. Usually, a browser at a client machine, such as client 108 or data processing system 300, submits a request for information identified by a URL. Retrieval of information on the Web is generally accomplished with an HTML-compatible browser. The Internet is also widely used to transfer applications to users using browsers. With respect to commerce on the Web, consumers and businesses use the Web to purchase various goods and services. In offering goods and services, some companies offer them solely on the Web, while other companies use the Web to extend their reach. Information about the World Wide Web can be found at the web site of the World Wide Web Consortium at http://www.w3.org.

Some of the methods and protocols for using the World Wide Web are hereinafter described to provide background information for the present invention. Hypertext Transport Protocol is a communication protocol for transferring files in a web environment, such as a web on an intranet or the World Wide Web on the Internet. HTTP provides a message format into which information necessary for implementing a rating sensitive request may be placed. In so doing, the HTTP standard may be modified to allow the enhancement of rating sensitive communication.

Hypertext Transport Protocol (HTTP)

HTTP is a protocol with the lightness and speed necessary for a distributed collaborative hypermedia information system. It is a generic, stateless, object-oriented protocol that may be used for many similar tasks, such as name servers and distributed object-oriented systems, by extending the commands, or "methods," used. A feature of HTTP is the negotiation of data representation, which allows systems to be built independently of the development of new advanced representations. When many sources of networked information are available to a reader, and when a discipline of reference between different sources exists, it is possible to rapidly follow references between units of information, which are provided at different remote locations. As response times should ideally be as short as possible, this requires a fast, stateless, information retrieval protocol. The HTTP protocol describes how a client acquires a document, such as a web page, or hypertext document from an HTTP server given an HTTP document address. On the Internet, communications take place over a Transmission Control Protocol/Internet Protocol (TCP/IP) connection. This does not preclude this invention being implemented over any other protocols on the Internet or other networks. In these cases, the mapping of the HTTP request and response structures onto the transport data units of the protocol in question is outside the scope of this description of the invention.

The HTTP protocol is basically stateless, with a transaction consisting of a connection, a request, a response, and a close. A connection is the establishment of a communication connection by the client to the server. When using TCP/IP, port 80 is the well-known port, but other non-reserved ports may be specified in the URL. A request is the sending, by the client, of a request message to the server. A response is the sending, by the server, of a response to the client. A close is the closing of the connection by either of the parties. Header information is sent in the ISO Latin-1 character set in CRLF (carriage return/line feed pair) terminated lines.

The client makes a TCP-IP connection to the host using the domain name or IP number and the port number given in the address. If the port number is not specified, 80 is always assumed for HTTP. After the server accepts the connection, the client sends a document request consisting of a line of ASCII characters terminated by a CRLF pair. This request consists of the word "GET", a space, and the document address, omitting the "http:" host and port parts when they are the coordinates previously used to make the connection. The document address consists of single word, i.e., no spaces.

The response to a simple GET request is a message in hypertext mark-up language (HTML). This is a byte stream of ASCII characters as lines delimited by an optional carriage return followed by a mandatory line feed character, and these lines may be of any length. The message is terminated by the closing of the connection by the server. Well-behaved clients read the entire document as fast as possible and do not wait for user action before reading the whole of the document. Error responses are supplied in human readable text in HTML syntax. There is no way to distinguish an error response from a satisfactory response except for the content of the text. The TCP/IP connection is broken by the server when the whole document has been transferred. The client may abort the transfer by breaking the connection before the whole document is transferred, in which case the server does not record any error condition. The server usually does not store any information about the request after disconnection.

HTTP Request

An HTTP request message provides one possible message format, among other possible message formats, for structuring a rating sensitive request according to the present invention. The request is sent with a first line containing the method to be applied to the object requested, the identifier of the object, and the protocol version in use, followed by further information. The format of the request is:

| | |
|---|---|
| Request | SimpleRequest \| FullRequest |
| SimpleRequest | CET URI CrLf |
| FullRequest | Method URI ProtocolVersion CrLf |
| | [*<HTRQ Header>] |
| | [<CrLf> <data>] |
| Method | Method identifier, usually alphanumeric |
| ProtocolVersion | HTTP/N.N, where N is a valid number |
| URI | Defined in standard specifications |
| <HTRQ Header> | <Fieldname> : <Value> <CrLf> |
| <data> | MIME-conforming-message |

The Protocol/Version field defines the format of the rest of the request. Currently, this field would usually contain HTTP/1.0 or HTTP/1.1.

The Web is an information space. Human beings have a lot of mental machinery for manipulating, imagining and finding their way in spaces. Uniform Resource Identifiers (URIs) are the points in that space. Unlike web data formats, such as HTML or Extensible Markup Language (XML), and web protocols, such as HTTP/1.0 or HTTP/1.1, there is only one web naming/addressing technology, that is URIs. Uniform Resource Identifiers are a generic set of all names/ addresses specified by short strings that identify resources in the Web: documents, images, downloadable files, services, electronic mailboxes, and other resources. They make resources available and addressable in the same simple way under a variety of naming schemes and access methods, such as HTTP, File Transport Protocol (FTP), and Internet mail. It is an extensible technology; there are a number of existing addressing schemes, and more may be incorporated over time.

Uniform Resource Locators (URLs) are the set of URI schemes that have explicit instructions on how to access the resource on the Internet. Uniform Resource Names (URNs) are URIs that have an institutional commitment to persistence, availability, etc. Uniform Resource Citations, or Uniform Resource Characteristics (URCs), are a set of attribute/value pairs describing a resource. Some of the values may be URIs of various kinds. Others may include, for example, authorship, publisher, datatype, data, copyright status, and shoe size. They are not normally defined as a short string but a set of fields and values with some free formatting.

The method field indicates the method to be performed on the object identified by the URL. The method GET is always supported, and many other methods are specified in the HTTP standard that may be extended occasionally. GET retrieves whatever data that is identified by the URI, so where the URI refers to a data-producing process or a script, it is this produced data which will be returned and not the source text of the script or process. HEAD is the same as GET but returns only HTTP headers and no document body.

Request headers are format headers with special field names, as well as any other HTTP object headers or MIME headers. "Data" is content of an object that is sent, depending on the method, with the request and/or the reply. MIME stands for Multipurpose Internet Mail Extensions and is the standard for specifying the type of document.

HTTP Request fields are header lines that are sent by the client in an HTTP protocol transaction. All lines are format headers. The list of headers is terminated by an empty line. Many different fields are specified in the HTTP standard. The Accept: field contains a semicolon-separated list of representation schemes (Content-Type metainformation values) which will be accepted in the response to this request. The set given may, of course, vary across requests from the same user. This field may be wrapped onto several lines, and more than one occurrence of the field is allowed, with the significance being the same as if all the entries have been in one field. The format of each entry in the list is:

<field>=Accept:<entry>*[, <entry>]

<entry>=<content type>*[; <parameters>]

An example might be:

Accept: text/plain, text/html

Accept: text/x-dvi; q=.8; mxb=100000; mxt=5.0, text/x-c for specifying plain text, HTML, and DVI files. In order to save time and also allow clients to receive content types of which they may not be aware, an asterisk "*" may be used in place of either the second half of the Content-Type value or both halves. An example might be:

Accept: *.*, q=0.1

Accept: audio/*, q=0.2

Accept: audio/basic q=1 which may be interpreted as "if you have basic audio, send it; otherwise, send me some other audio; or failing that, just give me what you've got."

Parameters on the content type are useful for describing resolution, color depths, etc. They allow a client to specify in the Accept: field the resolution of its device. This may allow the server to economize greatly on transmission time by reducing the resolution of an image, for example, enabling a more appropriate custom-designed black and white image to be selected rather than giving the client a color image to convert into monochrome. Examples may include dots-per-inch (DPI), color/monochrome, etc.

The Accept-Encoding: field is similar to Accept: but lists the content-encoding types that are acceptable in the response.

<field>=Accept-Encoding:<entry>*[,<entry>]

<entry>=<content transfer encoding>*[,<param>]

An example would be:

Accept-Encoding: x-compress; x-zip for compressed and zip files.

The User-Agent: field specifies the software program used by the original client. The format of the field is:

<field>=User-Agent:<product>+

<product>=<word>[/<version>]

<version>=<word>

An example might be:

UserAgent:WebBrowser/1.0 for the browser program used to generate the request.

There are several header fields given with, or in relation to, objects in HTTP, all of which are optional. These headers specify metainformation, that is, information about the object, not the information that is contained in the object. Any header fields that are not understood should be ignored. The order of header lines within the HTTP header has no significance.

The Content-Type: field is slightly different than MIME types. It is reasonable to put strict limits on transfer formats for mail, where there is no guarantee that the receiver will understand an obscure format. However, in HTTP, one knows that the receiver will be able to receive it because it will have been sent in the Accept: field. There are several advantages for a very complete registry of well-defined types for HTTP, which would not be recommended for mail. In this case, the Content-Type list for HTTP may be a superset of the MIME list. MIME provides for a number of "multipart" types. These are encapsulations of several body parts in the one message. In HTTP, multipart types may be returned on the condition that the client has indicated acceptability (using Accept) of the multipart type and also of the content types of each constituent body part.

The URI gives the identifier with which the object may be found within the Web. There is no guarantee that the object can be retrieved using the URI specified. However, it is guaranteed that if an object is successfully retrieved using the URI, it will be, to a certain given degree, the object that the URI specified. If the URI is used to refer to a set of variants, then the dimension in which the variants may differ must be given with the "vary" parameter:

URI=<uri>[;vary=dimension [, dimension]*]

dimension=Content-Type|language|version

If no "vary" parameters are given, then the URI may not return anything other than the same bit stream as the specialized object. Multiple occurrences of this field give alternative access names or addresses for the object. One example of this field is:

URI http://www.ibm.com/products/product1.multi;

vary=content-type

This indicates that retrieval given the URI will return the same document, never an updated version, but optionally in a different rendition. Another example of this field is:

URI http://www.ibm.com/products/products.multi;

vary=content-type language, version

This indicates that the URI will return the same document, possibly in a different rendition, possibly updated, and without excluding the provision of translations into different languages.

HTTP Response

An HTTP response message provides one possible message format, among other possible message formats, for structuring a response to a rating sensitive request according to the present invention. The response from the server starts with the following syntax:

| <status line> | : : = <http version> <status code> <reason line> <CRLF> |
|---|---|
| <http version> | : : = 3*<digit> |
| <status code> | : : = 3*<digit> |
| <digit> | : : = 0 \| 1 \| 2 \| 3 \| 4 \| 5 \| 6 \| 7 \| 8 \| 9 |
| <reason line> | : : = * <printable> |

<http version> identifies the HyperText Transfer Protocol version being used by the server, e.g., HTTP/1.0. <status code> gives the coded results of the attempt to understand and satisfy the request as a three-digit ASCII decimal number. <reason string> gives an explanation for a human reader except where necessary for particular status codes. Fields on the status line are delimited by a single blank, and parsers should accept any amount of white space.

The response headers on returned objects are similar to the request headers, as well as any MIME conforming headers, notably the Content-Type field. Additional information may follow as response data in the format of a MIME message body. The significance of the data depends on the status code. The Content-Type used for the data may be Content-Type that the client has expressed as its ability to accept, e.g., text/plain or text/html.

There are several values of the numeric status code to HTTP requests, some of which are described here. The data sections of Error, Forward and Redirection responses may be used to contain human-readable diagnostic information. "Success 2xx" codes indicate success. If present, the body section is the object returned by the request and it is a MIME format object, i.e., text/plain, text/html, or one of the formats specified as acceptable in the request. An "OK 200" code indicates that the request was fulfilled. An "Accepted 202" status code indicates that the request has been accepted for processing, but the processing has not been completed.

When a "Partial Information 203" status code is received in the response to a GET command, this indicates that the returned metainformation is not a definitive set of the object from a server with a copy of the object but is from a private overlaid web. This may include annotation information about the object, for example. A "No Response 204" status code indicates that the server has received the request, but there is no information to send back and the client should stay in the same document view. This is mainly to allow input for scripts without changing the document at the same time.

The "Error 4xx" status codes are intended for cases in which the client seems to have erred, and the "Error 5xx" codes are for the cases in which the server is aware that the server has erred. The body section may contain a document describing the error in human readable form. The document is in MIME format and may only be in text/plain, text/html, or one of the formats specified as acceptable in the request. The "Bad Request 400" status code indicates that the request had bad syntax or was inherently impossible to be satisfied. The "Forbidden 403" status code indicates that the request is for something forbidden. The "Not Found 404" status code indicates that the server has not found anything matching the URI given. The "Not Implemented 501" status code indicates that the server does not support the facility required. The "Redirection 3xx" codes indicate an action to be taken, normally automatically, by the client in order to fulfill the request.

Rating Systems

As previously described, rated content is currently transmitted across the Web in a manner that allows a browser in conjunction with a filter application to screen objectionable content. Part of the Web infrastructure that allows a browser to screen content consists of a content label mechanism in conjunction with a rating system and rating service. The current web infrastructure that provides support for rating systems may also be used in association with the rating sensitive requests of the present invention.

The Platform for Internet Content Selection (PICS™) specification enables labels (metadata) to be associated with Internet content. The specification was originally designed to help parents and teachers control what children access on the Internet, but it also facilitates other uses for labels, including code signing and privacy. The PICS platform is one on which other rating services and filtering software have been built. Many authors and web site operators offer materials that they realize will not be appropriate for all audiences. They may label their materials to make it easier for filtering software to block access. PICS does not endorse any particular labeling vocabulary.

The goal of the PICS effort is to enable a marketplace in which many different products and services will be developed, tested, and compared. Some organizations may rate items on well-known dimensions, using their own techniques and viewpoints to determine actual ratings. Other organizations may choose to develop their own dimensions for rating. This motivates the distinction between a rating system and a rating service. Some services may provide access to their ratings on-line from an HTTP server, while others may either ship them in batches or transmit them on floppy disks or CD-ROMs.

At the core of the PICS infrastructure is the rating service. The rating service either chooses an existing rating system or develops a new rating system to use in labeling content. The rating system, which is described in a human readable form at the rating system URL, specifies the range of statements that can be made. The rating service establishes criteria for determining who can label content using their name and how the labels must be applied. This combination of criteria and rating service are uniquely identified by the particular service URL. This service URL becomes the "brand" of the rating service. At a minimum, the service URL will return a human readable form of the rating criteria and a link to the description of the rating system. The rating service is also responsible for delivering a service description file. This is a machine-readable version of the rating system with pointers to the rating system URL and the rating service URL. While not required, it is recommended that this be available automatically at the service URL.

A labeler, given authority by the rating service, uses the criteria established by the rating service, along with the rating system, to label content. These content labels contain a statement about the content of the resource being labeled and contain a link back to the service URL. Content labels can come in the content itself, with the content, or from a trusted third party, such as a label bureau. Policies determine what actions are taken based on the specific statements in the content label. If a content label is based on an unknown service URL, it is a simple (and potentially automatable) task to retrieve the appropriate service description file to understand what statements are being made in the label.

A rating service is an individual, group, organization, or company that provides content labels for information on the Internet. The labels it provides are based on a rating system. Each rating service must describe itself using a newly created MIME type, application/pics-service. Selection software that relies on ratings from a PICS rating service can first load the application/pics-service description. This description allows the software to tailor its user interface to reflect the details of a particular rating service, rather than providing a "one design fits all rating service" interface.

Each rating service selects a URL as its unique identifier. It is included in all content labels that the service produces to identify their source. To ensure that no other service uses the same identifier, it must be a valid URL. In addition, the URL, when used within a query, serves as a default location for a label bureau that dispenses this service's labels.

A rating system specifies the dimensions used for labeling, the scale of allowable values on each dimension, and a description of the criteria used in assigning values. For example, the MPAA rates movies in the United States based on a single dimension with allowable values G, PG, PG-13, R, and NC-17. Each rating system is identified by a valid URL. This enables several services to use the same rating system and refer to it by its identifier. The URL that names a rating system can be accessed to obtain a human-readable description of the rating system. The format of that description is not specified as a standard.

A content label, or rating, contains information about a document. A content label, or rating, has three parts: (1) the URL naming the rating service that produced the label; (2) a set of PICS-defined or extensible attribute-value pairs that provide information about the rating, such as the date that the rating was assigned; and (3) a set of rating-system-defined attribute-value pairs, which actually rate the item along various dimensions, also called categories.

As previously described, rated content is currently transmitted across the Web in a manner that allows a browser, in conjunction with a filter application, to screen objectionable content. The current rating systems may also be used with the present invention to rate the content that is to be blocked from transmission. The Recreational Software Advisory Council (RSAC) is an independent, non-profit organization that empowers the public, especially parents, to make informed decisions about electronic media by means of an open, objective, content advisory system. The RSACi (RSAC on the Internet) system provides consumers with information about the level of sex, nudity, violence, offensive language (vulgar or hate-motivated) in software games and Web sites. To date, the RSACi system has been integrated into Microsoft's browser, Internet Explorer. The RSACi system provides a simple, yet effective rating system for Web sites which both protects children and the rights of free speech of everyone who publishes on the World Wide Web. When a parent sets the levels for their child within a Web browser, they may be offered an option that says, "Do not go to unrated sites."

RSAC works closely with the PICS standard. FIG. 4 shows the four categories of the RSACi system, with the five levels and their descriptors. It is these levels that parents and other interested individuals set within a browser or filtering software using a document of type application/pics-service.

A rating service is defined by a document of type application/pics-service. FIGS. 5A and 5B provide an example of a rating service described by a document of MIME type application/pics-service in accordance with the RSACi rating system. The MIME type application/pics-service is intended to describe a particular rating service in sufficient detail to automatically generate a user interface for configuring content selection software that relies on the rating service.

Figure 6:
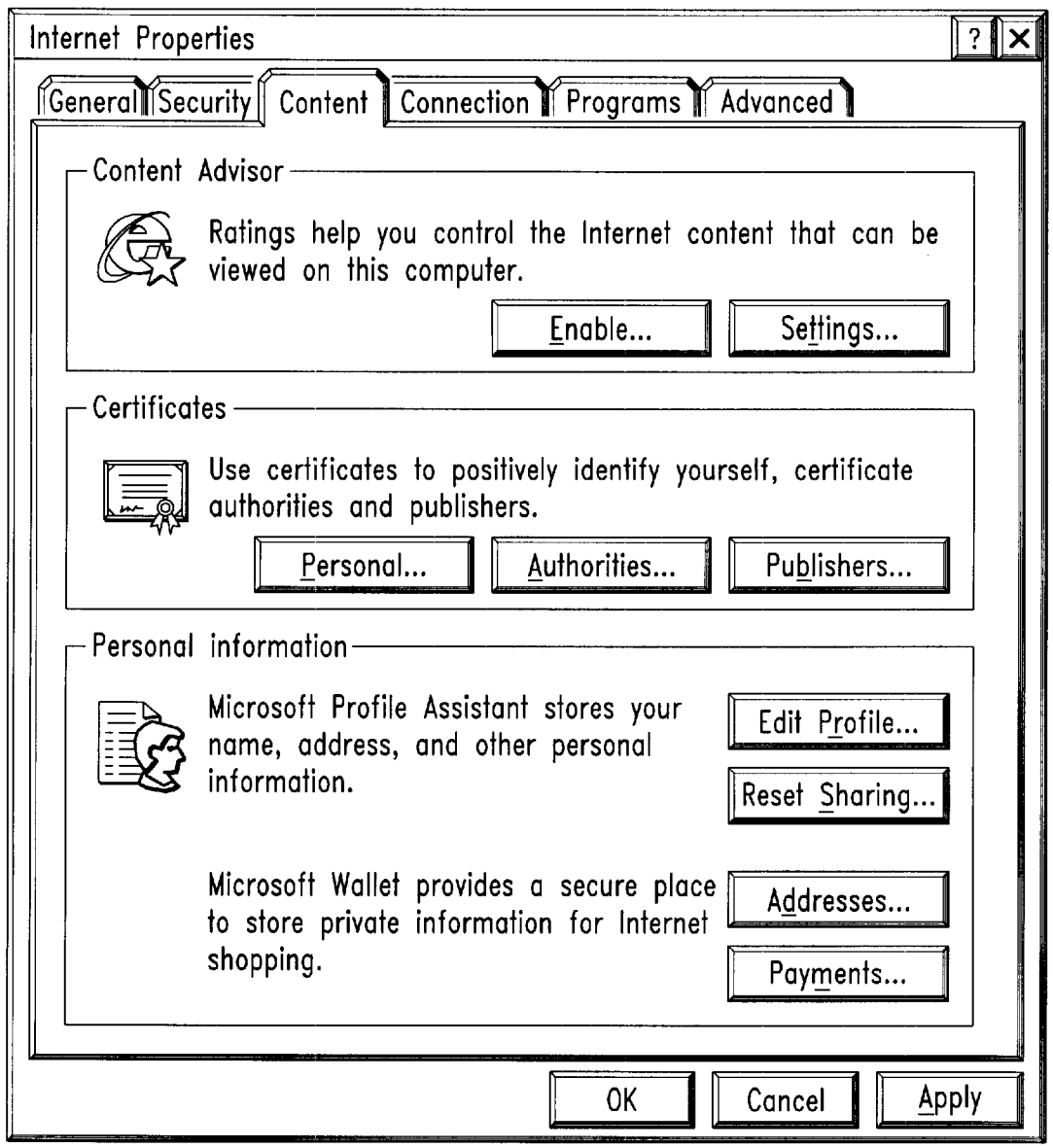
FIG. 6 is a dialog box showing the Internet Properties dialog for entry into the Content Advisor dialog.
Figure 7:
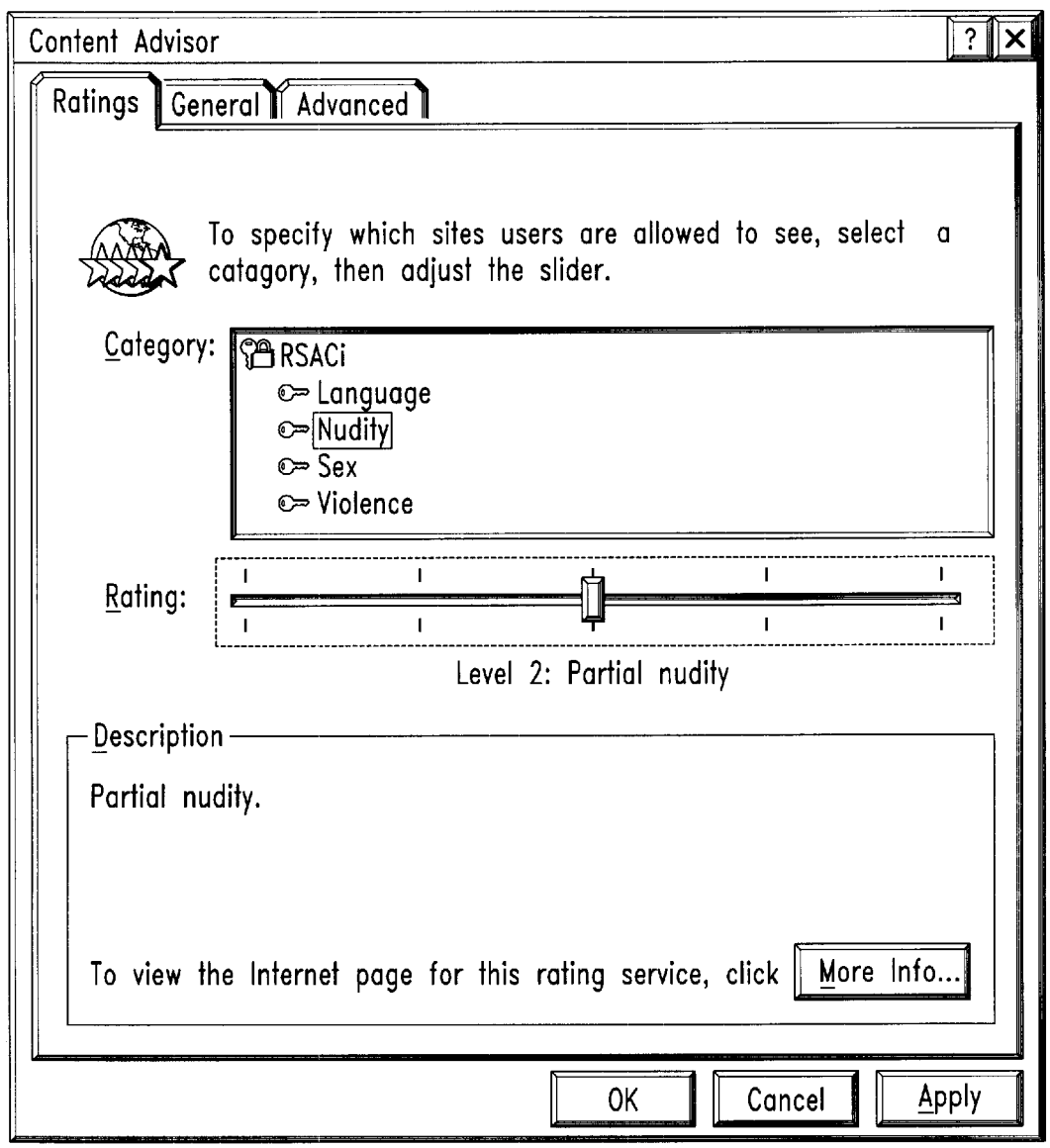
FIG. 7 is a dialog box showing the Ratings tab parameters in which a user may select the rating levels according to the RSACi rating system.
Figure 8:
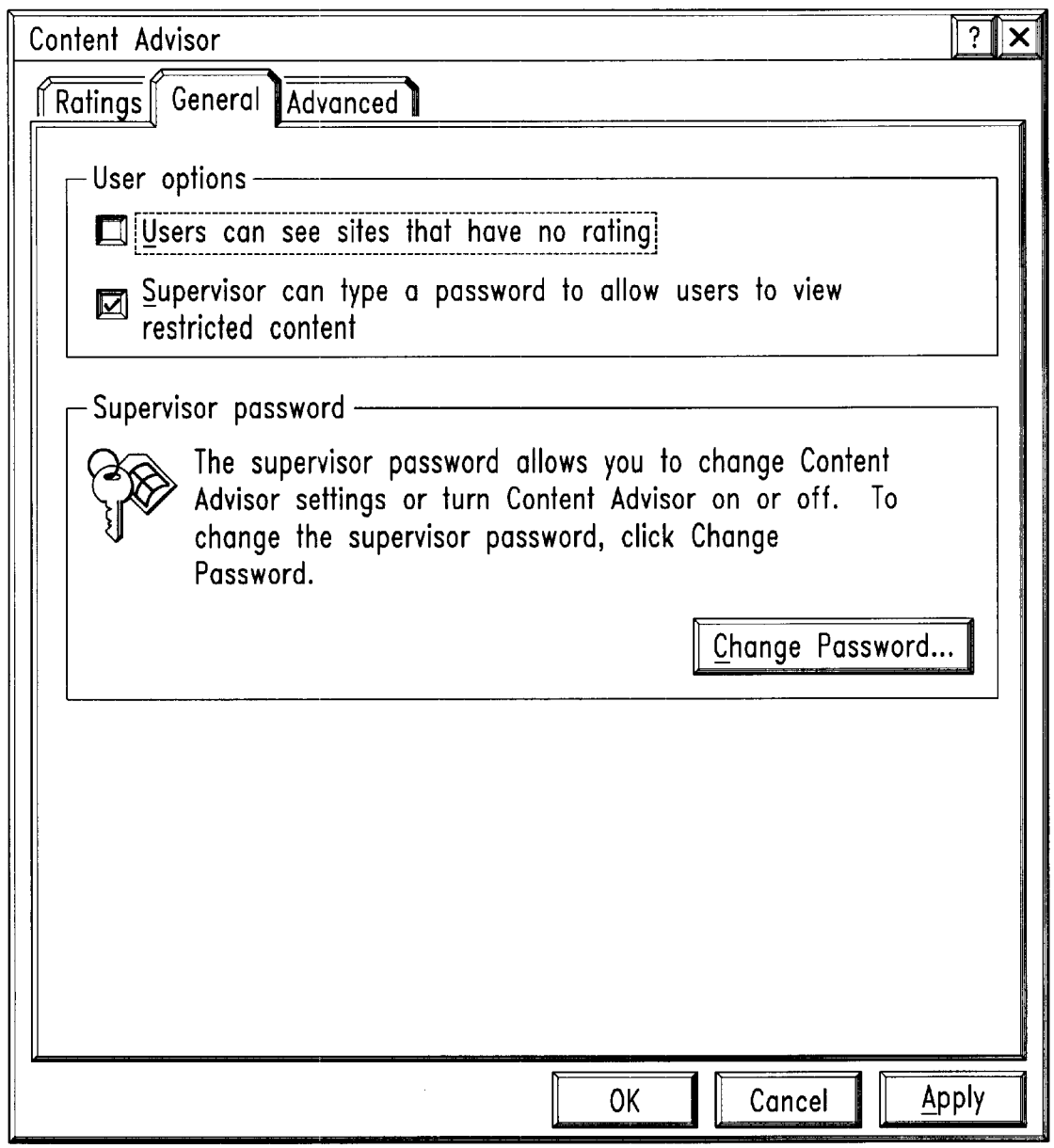
FIG. 8 is a dialog box showing the General tab for setting general properties within the Content Advisor dialog.
Figure 9:
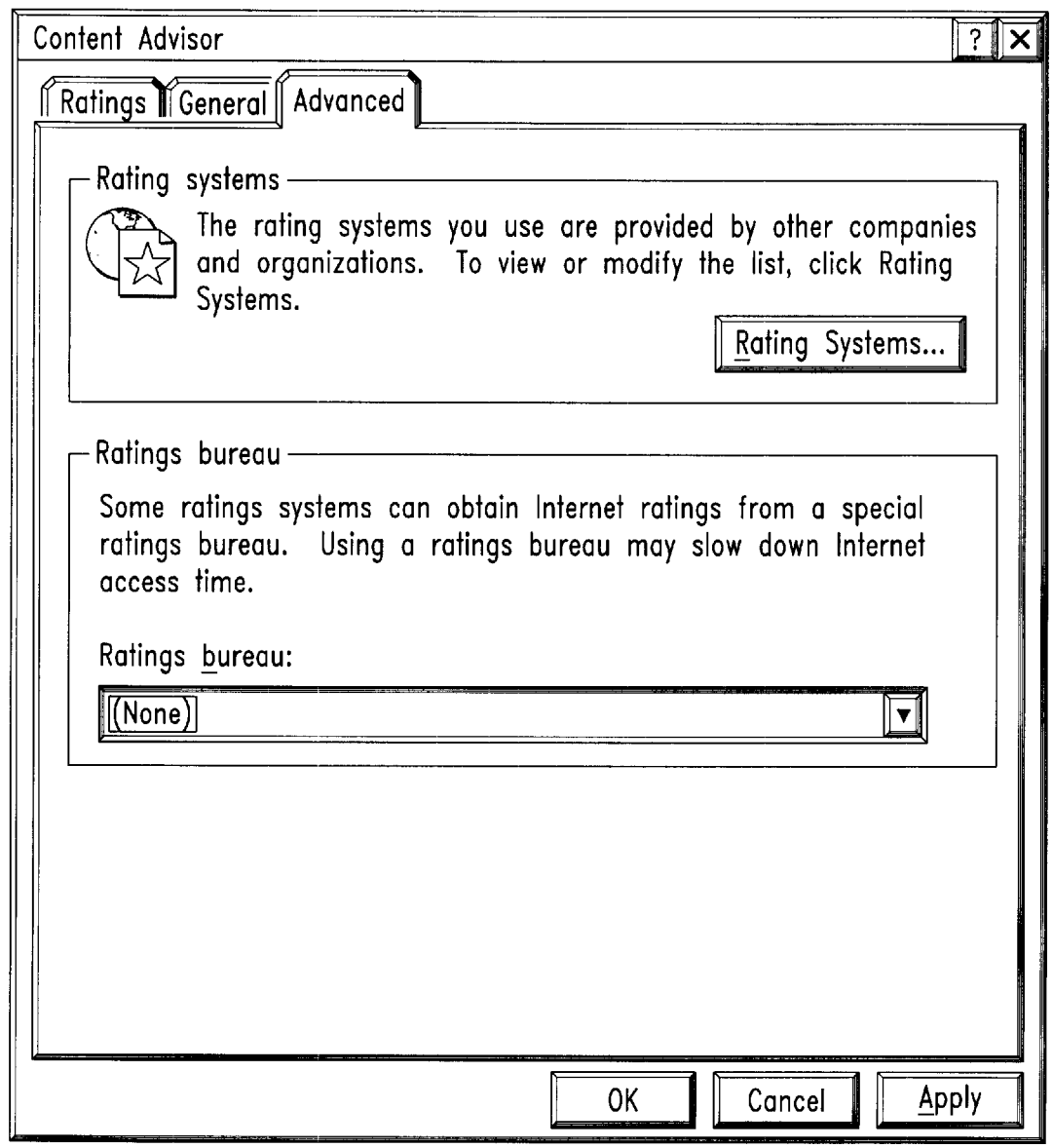
FIG. 9 is a dialog box showing the Advanced tab for setting rating system and rating bureau options.

FIGS. 6 through 9 show the steps in which user rating preferences are set as rating level parameters within a user interface for Microsoft's Internet Explorer, called Content Advisor, while using the rating services document from RSAC. FIG. 6 is a dialog box showing the Internet Properties dialog for entry into the Content Advisor dialog. FIG. 7 is a dialog box showing the Ratings tab parameters in which a user may select the rating levels according to the RSACI rating system. FIG. 8 is a dialog box showing the General tab for setting general properties within the Content Advisor dialog. FIG. 9 is a dialog box showing the Advanced tab for setting rating system and rating bureau options.

The quoted URL in the rating service field identifies the rating service. This identifier is included in all of the labels provided by the rating service. Dereferencing the URL yields a human-readable description of the service. If the optional URL for an icon for the rating service is supplied, it is dereferenced relative to the rating service URL. The name of the rating system is intended to be short and human-readable, with the description being a longer description, suitable perhaps for a pop-up box. A complete human-readable description is available from the rating service's URL.

The quoted URL in the rating system field identifies the rating system used by this service. Dereferencing the URL yields a human-readable description of the rating system. All remaining relative URLs in the application/pics-service description are dereferenced relative to the rating system URL, since they describe features of the rating system.

The machine-readable description also describes the categories used in the rating system. There may be one or more categories for a given rating system. A single document may have a rating on any or all of these categories. Categories can be nested within one another.

A category has a "transmission name," which is used in the actual label for a document. Transmission names should be as short as reasonable, but they may be complete URLs if desired. They must be unique within a given rating system, i.e., two categories in the same rating system may not have the same transmission name.

Unlike the name and the description strings, transmission names must be the same in all of them. Transmission names are case sensitive to allow URLs to be used as transmission names. In addition to the transmission name, which is required, a category may optionally have an icon and a human-readable description.

Categories may be nested within one another. In this case, the transmission name is created in the usual way by starting with the outermost category's transmit-as string, adding a "/" and proceeding inward in the nesting.

Values in PICS labels may be integers or fractions, with no greater range or precision than that provided by IEEE single-precision floating point numbers. Values may be given to names by using the label attribute. When a value is given a name, it may optionally have an attached icon and a human-readable description. The description for each category can specify a restriction on the range of permissible values for certain named attributes.

Once a label is created, it is distributed along with documents in one of several ways. The recommended method, if an HTTP server allows it, is to insert an extra header in the HTTP header stream that precedes the contents of documents that are sent to web browsers. The correct format, as documented in the specifications, is to include the two headers: Protocol, and PICS-Label. FIG. 10 shows an example of an HTTP response with the Protocol header and the PICS-Label header.

The next best method is to distribute and obtain labels through a label bureau running on a server according to the PICS specification. If neither of these methods is available, a simpler but more limited method is to embed labels in HTML documents, but not with images, video, or anything else. It is also cumbersome to insert the labels into every HTML document. Some browsers, notably Microsoft's Internet Explorer versions 3 and 4, will download the root document for a web server and look for a generic label there.

A label consists of a service identifier, label options, and a rating. The service identifier is the URL chosen by the rating service as its unique identifier. Label options give additional properties of the document being rated, as well as properties of the rating itself, such as the time the document was rated. The rating itself is a set of attribute-value pairs that describe a document, along with one or more dimensions. One or more labels may be distributed together as a list.

A specific label applies to a single document. If the document is in HTML format, it may refer to other documents, either by external reference (for example, using the <A HREF=...> tag) or by requesting that they be displayed in-line (for example, using the <img...> or <object...> tag). A label applies to the given document only, not to the referenced documents.

A generic label (identified by the use of the "generic" option) applies to a document whose URL begins with a specific string of characters (specified using the "for" option). A generic label does not have the expected semantics of a "default" label that can be overridden by more specific labels. While a specific label does override a generic label when a client has access to both, the two labels may be distributed separately and, thus, a client may have access to only the generic label. A server can keep track of defaults and overrides, and generate a specific label based on a default that is not overridden in its local database. However, a generic label for a site or directory should only be distributed if it applies to all the documents in that site or directory.

A rating service may provide a generic label for any or all prefixes of a given URL but should provide only one specific label for that URL. When the specific label for a document can be found, it should be used in preference to any generic label. Lacking a specific label, any generic label may be substituted, but preference should be given to the generic label that has the longest string. Some PICS client software may impose restrictions on the use of generic labels. For example, a client may choose to ignore a generic label that applies to a node in the URL tree more than two levels above the node where the document is located.

PICS labels can also be retrieved separately from the documents to which they refer. To request labels in this way, a client contacts a label bureau or rating bureau. A label bureau is an HTTP server that understands a particular query syntax. It can provide labels for documents that reside on other servers and for documents available through protocols other than HTTP.

Rating services have been encouraged to act as label bureaus, providing on-line access to their own labels. By default, the URL that identifies a rating service also identifies its label bureau. If a client requests the URL that identifies a rating service, a human-readable description of the service is returned. If, on the other hand, a client requests the same URL and includes query parameters, it should be interpreted as a request for labels.

A rating service, however, is not required to act as a label bureau. A rating service may choose a different URL, perhaps even on a different HTTP server, to act as its label bureau. If a label bureau is implemented, then additional time is necessary to retrieve labels before the documents are retrieved. A document server may wait ro a response from a label bureau server before responding to the original document request. This additional retrieval time can create significant overhead.

Two problems arise while using the PICS system. The first problem is that a synchronization problem arises when a document has been examined and a label generated but the document is later modified without updating the label. This can happen legitimately when someone updates a document while forgetting to update its label. It can also happen as a result of tampering with the document by an unauthorized party. PICS labels contain three option fields intended to help deter this kind of problem: a creation date, an expiration date, and a checksum.

If the objective is to simply detect accidental changes, then the date of last modification of the document can be calculated when the label is created and stored in the "at" field. Assuming that the last modification time is accurately maintained, this will detect updates to the document made after the label was created.

If the document is expected to be updated infrequently or periodically, the "until" or "exp" label can contain an expiration date that should cause the label to be invalid before the document is next updated. This also does not guard against a concerted, malicious attack.

If the label is intended to apply only to the data that was actually rated, then a form of a checksum, called a "message digest," can be applied to the data when the label is created. The message digest is converted into US-ASCII characters using MIME base-64 encoding and stored in the mic-md5, also called md5, field. When the document is later retrieved, the same algorithm can be used to recompute the message digest, and the two digests can be compared. The md5 algorithm is designed so that it is extremely unlikely that the two message digests will be the same if the document has been tampered with in any way.

The second problem is that of tampering with or forging labels. The end user needs some way of being reassured that the label received was created by the expected rating service and that it has not been altered since it was created. PICS addresses this problem by allowing labels to be "digitally signed." A digital signature, while not currently legally recognized, is a cryptographic technique to provide exactly this assurance. The use of digital signatures greatly increases the complexity of implementing the rating system.

Regardless of the rating system or the means for implementing the system on the Internet, a serious security problem occurs when rated material, or any sensitive information, is downloaded to a user's computer. The problem occurs because the user's computer caches each item downloaded in a memory cache. The caching process is performed automatically, without regard to whether the information being downloaded is of sensitive or rated nature.

A memory cache is most often defined as a small, fast memory holding recently accessed data, designed to speed up subsequent access to the same data. It is most often applied to processor-memory access but is also used for a local copy of data accessible over a network or the Internet using a web browser. When data is read from or written to main memory, a copy is also saved in the cache, along with the associated main memory address.

The web browser monitors addresses of subsequent reads to see if the required data is already in the cache. If it is already in the memory cache (a cache hit), the data is returned immediately from memory cache, and the main memory read is aborted or not started. If the data is not cached (a cache miss), then it is fetched from the network connection and also saved in the cache.

Generally, conventional browsers define cache as a memory allocation of memory addresses from a memory. Recently visited web pages are cached in the allocated addresses of the computer's memory. Alternatively, browser cache is also memory allocation of memory addresses from a disk cache on a hard disk drive, which are allocated as a cache folder for storing recently visited web pages.

Upon receiving a web page request, the browser first checks the memory cache for the requested web page. If the requested web page has been visited during the current session, and that visit occurred recently enough that the web page has not been overwritten by more recently visited web pages, a cache hit occurs, and the web page contents are loaded from memory cache. If a memory cache hit does not occur, the browser then checks the disk caches for the requested web page. If a disk cache occurs, the page information is loaded from the disk cache; if not, the browser loads the web page from the requested web site on the Internet.

Browser cache management is crucial to the effective operation of a browser. Due to the differences in transfer rates between the browser and the Internet connection, and between the browser and the onboard memory or hard drive memory, the most effective browser operation is to load contents of requested web pages directly into the browser defined cache. Subsequent web page requests are then handled by loading the requested web pages from the cache rather than the web site on the Internet. Thus, the user is not subjected to enormous amounts of idle time waiting for the web page to be loaded from an Internet connection.

However, even moderate browsing generates vast amounts of data associated with recently visited web pages. The operation of a browser may be impeded if the browser is searching reams of cache memory for a cache hit after each web page request. Therefore, most conventional browsers allow users to select predefined cache limits in both the memory cache and the hard disk cache. Once these memory limits are reached, the oldest data is overwritten with current web page contents; and the amount of memory allocated as cache memory and hard disk cache remains manageable.

Nonetheless, the problem of sensitive data being cached by the web browser remains a problem in current browser technologies. Users often request sensitive or private information from web sites. With the advent of more secure encryption means, the Internet is quickly becoming the distributed network of choice for financial institutions, government agencies, and professional groups.

As a user assesses a web site that supports sensitive data, the user generally must present a valid user identification and password before being granted access to requested data. The data is then usually encrypted and sent to the user's browser. Once the requested page is loaded onto the user's computer by the browser, a breakdown in security occurs. This happens because the requested data, which was handled as privileged data by the web server, is treated as any other data by the web browser, without regard to the sensitive nature of the data.

Sensitive data, or rated data, is given no more consideration by the web browser than any other type of data. Therefore, anyone having access to the user's browser may access the entire contents of the browser's cache. Any sensitive, important, rated, business or technical data stored in browser cache may be accessed without a valid user identification or password.

However, in a preferred embodiment of the present invention, the content of a web page is filtered solely as a function of the web browser. In the present invention, a user sets preference parameters that filter web page contents from being stored in the cache. Cache filters may take a variety of forms, such as ratings filters, web page identifier filters, and key word filters, which scan accessed contents of a web page for user selected terms.

Conversely, in another preferred embodiment of the present invention, the user sets preference parameters which filter web page contents to override the block-from-cache preferences and to store the filtered web pages which were previously designated as web pages not to be cached. Preferred embodiments of the present invention are now described with respect to FIGS. 11 and 12.

Figures 11, 12:
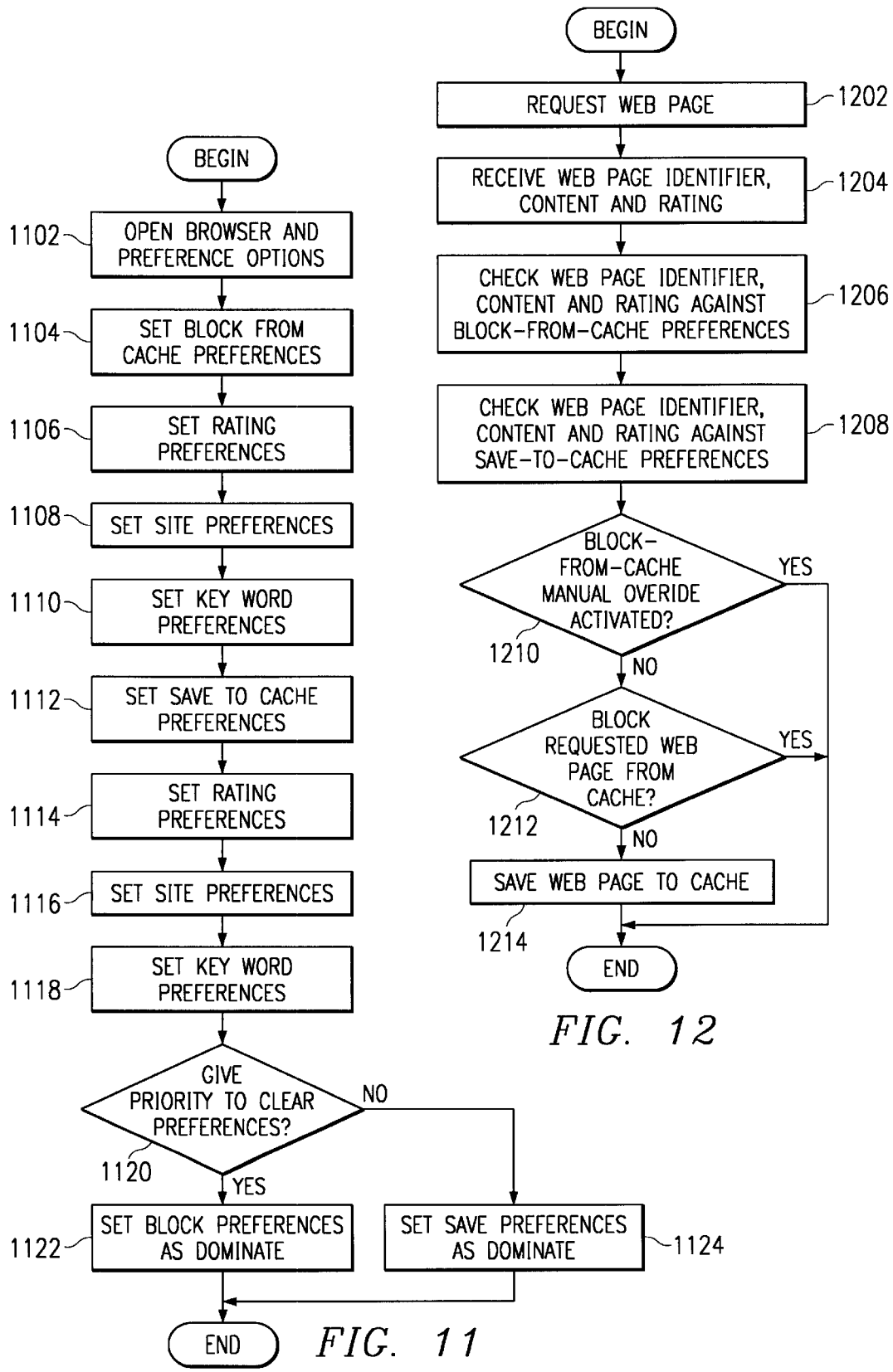
FIG. 11 illustrates a flowchart depicting the process of setting user defined preferences for blocking web page contents from a browser-defined cache in accordance with a preferred embodiment of the present invention.
FIG. 12 illustrates a flowchart depicting a process for blocking a web page from a browser-defined cache.

With reference now to FIG. 11, a flowchart depicts client-side processing for setting cache preference options for generating cache save and cache block parameters used for storing or blocking web page content from a browser defined cache. In this example, the client computer may be similar to data processing system 300 previously described with respect to FIG. 3, which is similar to clients 108, 112 and 110 previously described with respect to FIG. 1. Client 108 may be configured with browsing software similar to Microsoft Internet Explorer, available from Microsoft Corporation.

FIG. 11 is a flowchart depicting the process of setting user defined filter preferences for blocking web page contents from a browser defined cache in accordance with a preferred embodiment of the present invention. Initially, it should be noted that the process is contained and performed entirely within a web browser. Thus, the conventional web browser requires modification in order to perform the steps described herein.

The process of setting filter preference options for filtering a browser cache begins by opening a web browser and then opening the browser preference option menu (step 1102). The cache preference options for defining filter preferences consist of two types: block-from-cache filter options, and save-to-cache filter options. The web page filters work identically in both the block-from-cache and save-to-cache options in that the filter merely identifies a criteria set by the user. The criteria might be the identity of the web page, the nature of its contents, or the rating of the web page.

At step 1104, the user selects the block-from-cache preferences option. This preference option filters web pages from being written to the browser-allocated cache by the criteria discussed above. Thus, when a web page is opened and it is determined by the browser that the web page will not be cached, once that page is closed, the browser must again read the web page through the Internet or distributed net connection rather than finding the web page contents in browser cache.

In accordance with a preferred embodiment of the present invention, cache content filter preferences may take one of three possible forms. The first form is the rating filters, as discussed above with respect to FIGS. 6 through 10. At step 1106, the user sets the filter rating preferences, which determine which web pages will be blocked from entry into the cache and not saved.

Next, the user sets the site filter preferences (step 1108). Site filter preferences are merely a list of web sites selected by the user which, when accessed by the browser, will filter the web site from cache. Thus, the web site will not be saved to cache. Examples of such web sites might be a user's on-line brokerage house or bank, or perhaps web sites associated with the user's profession. Once a site is selected in the block-from-cache preferences, that site will no longer be stored in cache when the site is accessed by the browser.

The final form of cache filter is a content or key word filter. The user must also select content or key word filter preferences as performed above with respect to the previously mentioned filter types (step 1110). Here, the user selects key words or groups of key words which, when contained in an access web page, will filter any web page containing the selected words from being stored in browser cache.

In accordance with another preferred embodiment of the present invention, the key words filter function of the browser performs similarly to a search engine in that the browser searches an open page for key words or groups of key words. Upon finding the key words in the content of the search, the browser denies that page from entry in browser cache.

Thus, as with a conventional search engine, the user may select groups of words which are connected by logical operators, such as AND or OR or NOR. In one example, a user may be engaged in a profession, such as intellectual property, and may prefer that web pages related to this profession not be stored in cache, such that anyone examining the user's browser cache could not determine the subject matter of a case which the user might be pursuing. In order to keep pages relevant to the practice of intellectual property, the user may select filter terms, such as "intellectual property," "patents," and "trademark," as key word preferences. The boolean operator selected by the user may look something like "patents OR trademarks OR intellectual property." However, these are extremely broad terms and might very well cause an inordinate amount of unrelated data to be blocked from entry in the browser's cache.

To the possible detriment of the user, the key words in the above example would also block from entry in browser cache any general information web pages related to the U.S. Patent and Trademark Office, or even pages concerning actions taken by the Commissioner. The filtered web pages would be excluded from browser cache even though generic or political articles about the Patent and Trademark Office have little to do with the user's particular assignment or case.

Returning to the flowchart depicted in FIG. 11, the user sets save-to-cache preferences (step 1112). The save-to-cache filter works in the opposite manner from the block-from-cache filter discussed above with respect to step 1104. That is, once the content filter determines that a web page contains save-to-cache criteria, the browser saves that web page to cache. Clearly, the normal operating condition for a web browser is to save all web pages that are opened by the browser to cache. However, the present invention blocks certain web pages that are opened with the browser from being cached based on the web page rating, site identifier, or the contents of the web page. Therefore, the save-to-cache filter works in opposition to the block-from-cache filter in that certain web pages which ordinarily would be excluded from the browser cache by the block-from-cache filter are instead saved to browser cache by the save-to-cache filter.

At step 1114, the user selects rating filter preferences that determine web pages to be saved to cache based on the web page rating. Clearly, this step could be performed in conjunction with step 1106 by merely not specifying certain parameters to be blocked from cache. However, in the interest of expedience, the user may make a blanket selection of ratings to be filtered from being cached and, at step 1114, merely specify certain ratings that the user intends to be saved.

At step 1116, the user sets the web site filter preferences for saving selected web sites. The operation of the site preference works similarly to the operation of the rating preference in that, at step 1108, the user may select an entire site, including all of its related sites, to be blocked from cache. For instance, the user may select USPTO.gov to be blocked from cache. Thus, any web page containing a USPTO.gov path would not be written to cache.

Within the site USPTO.gov, however, the user may have access to important material which is not of private or sensitive content. An example of this might be the USPTO's edition of the Manual Patent Examination Procedures (MPEP). If the user sets a save-to-cache site preference at step 1116, even though the user previously selected block-from-cache preferences which would block all site paths containing "USPTO.gov", the web browser would still allow any path extension including /mpep to be stored in cache.

At step 1118, the user selects key word filter preferences that allow web pages containing the selected key words to be stored in cache. A specific example here might be using the name of the acting Commissioner of Patents, Q. Todd Dickinson, as a key word filter. As a result, even though a page may contain the word patent, trademark, or intellectual property, which would otherwise block the web page from cache as discussed with respect to step 1110 above, the words 'Q. Todd Dickinson' would force the web page to be written to cache, contrary to the filter preference set at step 1110.

Finally, the user determines whether to give priority to the block-from-cache preferences or the save-to-cache preferences (step 1120). In the present invention, browser operations differ from those of a conventional browser in that every web page accessed is not necessarily stored in cache. In an alternative embodiment of the present invention, the user selects priorities for implementation of filter preferences. Depending on the sequence in which the filters are applied, a web page may or may not be saved to cache.

Step 1120 gives the user the option of determining which set of preferences has priority over the other. The logical flow of performing block-from-cache filtering and then save-to-cache filtering has a different outcome from the logical flow of performing save-to-cache filtering and then block-from-cache filtering. Assuming, for example, that the user chooses to give priority to block-from-cache preferences, the browser would set the block-from-cache filter preferences as dominant (step 1122). Alternatively, if the user chooses not to give priority to the block-from-cache preferences, the browser would set the save-to-cache preferences as dominant (step 1124). The process would then end.

FIG. 12 is a flowchart depicting a process for blocking a web page from a browser-defined cache. Initially, a user makes a request for a web page (step 1202). After the request has been sent to the appropriate web server by the web browser, the browser receives the web page, which includes the web page identifier, the web page contents, and the web page rating (step 1204).

Ordinarily, a conventional browser saves the requested web page to cache without respect to the web page contents, ratings or identity. However, in the present invention, rather than automatically caching the requested web page, the browser filters the web page identifier, contents, and rating using block-from-cache preferences (step 1206).

Note that the logical flow of the process depicted in FIG. 12 is meant to reflect a preferred embodiment of the present invention, where block-from-cache preferences are given dominance over the conventional automatic caching of all requested web pages. Additionally, however, save-to-cache preferences are then given dominance over the block-from-cache preferences in this preferred embodiment. In practice, the browser determines which web pages are to be saved to cache based on save-to-cache preferences, and these web pages are automatically saved. All remaining web pages are also saved to cache, unless those web pages meet block-from-cache criterion.

After step 1206, the browser checks the web page identifier, contents, and rating against the save-to-cache preferences (step 1208). This step is only performed for web pages that have been determined in step 1206 to be blocked from cache. If a web page has been selected not to be written to cache in step 1206, it may ultimately be written to cache anyway if the user has selected the appropriate save-to-cache filter preferences.

In another embodiment of the present invention, after the browser filters a web page's identifier, contents, and rating against the block-from-cache option (step 1206) and save-to-cache option (step 1208), the browser checks to determine if the user has activated the manual block-from-cache override for the specific web page being viewed (step 1210). This further refinement of the present invention enables a user to override filter preference options, which are set in advance of Web browsing sessions and/or may not be entirely applicable to certain accessed web pages under unique circumstances.

Therefore, in an alternative embodiment of the present invention, a hot key, or hot spot, is provided on the browser, which, when activated, overrides the block-from-cache option set by the user. The user may force into cache web pages that would otherwise be blocked from cache by filter preference settings. Thus, rather than resetting filter preferences to accommodate a single web page occurrence, the user may activate a save-to-cache hot spot or hot key in order to save only the currently open web page to cache. Upon the opening of another web page, the browser resumes reliance upon preference settings, unless those selected options are again circumvented by use of the hot key.

After comparing both the block-from-cache preferences and the save-to-cache preferences to the identity, content, and rating of the open web page, a determination is made whether to block the requested web page from cache (step 1212). At step 1212, if the browser determines that some block-from-cache criteria is met without save-to-cache criteria being found, then the web page is not written to cache, and the process ends. If, on the other hand, no block-from-cache criteria is present in the web page, or if save-to-cache criteria is met, the web page is saved to cache (step 1214). The process then ends.

While the descriptions of the preferred embodiments of the present invention relate to accessing and downloading web pages, yet other embodiments relate to alternative browser functionality. Browsers also provide a user with a tool for invoking applications and routines not related to the Internet or web page accessing. For instance, browsers are used as viewers to examine the contents of documents and files. Once these documents and files are opened, the information in them is cached in browser cache. Additionally, browsers are used to invoke specific application programs and applets for performing application functions. The information displayed in the browser viewer is normally cached in the browser cache, similar to a web page. In an alternative embodiment of the present invention, a user may select block-from-cache and save-to-cache preferences related to any sensitive documents or applications. Thus, files and documents that are opened, created or viewed by the browser may be blocked from entry in browser cache.

It is important to note that, while the present invention has been described in the context of a fully functioning data processing system, those of ordinary skill in the art will appreciate that the processes of the present invention are capable of being distributed in a form of a computer readable medium of instructions and a variety of forms, and that the present invention applies equally regardless of the particular type of signal bearing media actually used to carry out the distribution. Examples of computer readable media include recordable-type media, such as floppy discs, hard disk drives, RAM, and CD-ROMs and transmission-type media, such as digital and analog communications links.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for blocking a client requested web page from cache, the method comprising the computer-implemented steps of:

generating a request for a web page on the client;

filtering the web page from being cached based on predefined preference data;

blocking the web page from cache based on filtering the web page; and displaying the web page on the client.

2. The method of claim 1, wherein the step of filtering is based on one of web page identifier, web page content, and web page rating.

3. The method of claim 2, wherein web page rating is appending a string to a Uniform Resource Identifier in the HTTP request message.

4. The method of claim 1, further comprising:

filtering the web page from being blocked from cache based on predefined preference data; and caching the web page.

5. The method of claim 1, further comprising:

initiating a one-time save-to-cache; and caching the web page.

6. The method of claim 1, wherein the step of generating a request for a web page is performed on a browser.

7. A method for blocking a client requested web page from a browser cache, the method comprising the computer-implemented steps of:

receiving a web page;

examining attributes associated with the web page;

blocking the web page from the browser cache based on the examination of the attributes associated with the web page; and displaying the web page on the client.

8. A method for blocking a client requested web page from cache, the method comprising the computer-implemented steps of:

invoking an application with a browser;

examining data attributes associated with the application;

blocking data from cache based on the examination of the web page; and displaying the web page on the client.

9. The method of claim 8, wherein the application is a viewer application.

10. A data processing system for blocking a client requested web page from cache, the system comprising:
generating means for generating a request for a web page on the client;
filtering means for filtering the web page from being cached based on predefined preference data;
blocking means for blocking the web page from cache based on filtering the web page; and
display means for displaying the web page on the client.

11. The system of claim 10, wherein the filtering means for filtering is based on one of web page identifier, web page content, and web page rating.

12. The system of claim 11, wherein web page rating is appending a string to a Uniform Resource Identifier in the HTTP request message.

13. The system of claim 10, further comprising:
filtering means for filtering the web page from being blocked from cache based on predefined preference data; and
caching means for caching the web page.

14. The system of claim 10, further comprising:
initiating means for initiating a one-time save-to-cache; and
caching means for caching the web page.

15. The system of claim 10, wherein the generating means for generating a request for a web page is performed on a browser.

16. A data processing system for blocking a client requested web page from a browser cache, the system comprising:
receiving means for receiving a web page;
examining means for examining attributes associated with the web page;
blocking means for blocking the web page from the browser cache based on the examination of the attributes associated with the web page; and
display means for displaying the web page on the client.

17. A data processing system for blocking a client requested web page from cache, the system comprising:
invoking means for invoking an application with a browser;
examining means for examining data attributes associated with the application;
blocking means for blocking data from cache based on the examination of the web page; and
display means for displaying the web page on the client.

18. The system of claim 17, wherein the application is a viewer application.

19. A computer program product in a computer readable medium for blocking a client requested web page from cache comprising:
generating instructions for generating a request for a web page on the client;
filtering instructions for filtering the web page from being cached based on predefined preference data;
blocking instructions for blocking the web page from cache based on filtering the web page; and
displaying the web page on the client.

20. A method for blocking a client requested web page from cache, the method comprising the computer-implemented steps of:
generating a request for a web page on the client;
comparing web page content of the requested web page with predefined preference data;
blocking the web page from cache based on the outcome of comparing web page content with predefined preference; and
displaying the web page on the client.

21. A method for blocking a client requested web page from cache, the method comprising the computer-implemented steps of:
receiving web page data, wherein the web page data comprises a web page and attributes defining the web page;
comparing at least two web page attributes with corresponding predefined preferences;
blocking the web page from cache based on filtering the web page on the basis of the comparison; and
displaying the web page on the client.

22. The method of claim 21, wherein one preference is web page size.

23. The method of claim 21, wherein one preference is based on one of web page identifier, web page content, and web page rating.

24. A method for blocking a client requested web page from cache, the method comprising the computer-implemented steps of:
allocating a frame buffer memory;
allocating a browser cache, wherein the memory allocation for the frame buffer allocation is less than the browser cache allocation;
receiving a web page;
comparing a web page attribute with a predefined preference;
writing the web page to the frame buffer memory;
blocking the web page from the browser cache on the basis of the comparison; and
displaying the web page on the client.

25. A system for blocking a client requested web page from cache comprising:
generating means for generating a request for a web page on the client;
comparing means for comparing web page content of the requested web page with predefined preference data;
blocking means for blocking the web page from cache based on the outcome of comparing web page content with predefined preference; and
display means for displaying the web page on the client.

26. A system for blocking a client requested web page from cache comprising:
receiving means for receiving web page data, wherein the web page data comprises a web page and attributes defining the web page;
comparing means for comparing at least two web page attributes with corresponding predefined preferences;
blocking means for blocking the web page from cache based on filtering the web page on the basis of the comparison; and
display means for displaying the web page on the client.

27. The system of claim 26, wherein one preference is web page size.

28. The system of claim 26, wherein one preference is based on one of web page identifier, web page content, and web page rating.

29. A system for blocking a client requested web page from cache comprising:

allocating means for allocating a frame buffer memory;

allocating means for allocating a browser cache, wherein the memory allocation for the frame buffer allocation is less than the browser cache allocation;

receiving means for receiving a web page;

comparing means for comparing a web page attribute with a predefined preference;

writing means for writing the web page to the frame buffer memory;

blocking means for blocking the web page from the browser cache on the basis of the comparison; and display means for displaying the web page on the client.

* * * * *